US012700776B2

(12) United States Patent
Shirai et al.

(10) Patent No.: US 12,700,776 B2
(45) Date of Patent: Aug. 4, 2026

(54) ACTUATOR DEVICE

(71) Applicant: NIDEC POWERTRAIN SYSTEMS CORPORATION, Zama (JP)

(72) Inventors: Hiroshi Shirai, Zama (JP); Shun Kato, Zama (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 204 days.

(21) Appl. No.: 18/779,433

(22) Filed: Jul. 22, 2024

(65) Prior Publication Data

US 2025/0038624 A1     Jan. 30, 2025

(30) Foreign Application Priority Data

Jul. 26, 2023     (JP) ................................. 2023-121484

(51) Int. Cl.
| | |
|---|---|
| *H02K 11/215* | (2016.01) |
| *F16H 25/20* | (2006.01) |
| *H02K 7/06* | (2006.01) |
| *H02K 21/16* | (2006.01) |

(52) U.S. Cl.
CPC ........... *H02K 11/215* (2016.01); *F16H 25/20* (2013.01); *H02K 7/06* (2013.01); *H02K 21/16* (2013.01); *F16H 2025/2075* (2013.01); *H02K 2207/03* (2013.01); *H02K 2211/03* (2013.01)

(58) Field of Classification Search
CPC ...... H02K 11/215; H02K 11/21; H02K 11/20;

H02K 7/06; H02K 7/00; H02K 21/16; H02K 21/14; H02K 21/12; H02K 2207/03; H02K 2211/03; F16H 25/20; F16H 2025/20

See application file for complete search history.

(56) References Cited

U.S. PATENT DOCUMENTS

| | | | | |
|---|---|---|---|---|
| 2018/0205305 A1* | 7/2018 | Chang | .................. | G03F 7/7085 |
| 2020/0153314 A1* | 5/2020 | Iwasaki | ................. | H02K 7/003 |

FOREIGN PATENT DOCUMENTS

| | | | | | |
|---|---|---|---|---|---|
| CN | 110291697 A | * | 9/2019 | .......... | H02K 7/1166 |
| EP | 1515419 A2 | * | 3/2005 | ............ | H02K 15/03 |
| EP | 2747257 A2 | * | 6/2014 | ........ | B29C 66/4312 |
| JP | 2016080131 A | * | 5/2016 | | |
| JP | 2019146437 A | * | 8/2019 | | |

(Continued)

OTHER PUBLICATIONS

Machine Translation of JP 2016080131 A (Year: 2016).*

(Continued)

*Primary Examiner* — Alexander A Singh
*Assistant Examiner* — Charlie Frank Mann, Jr.
(74) *Attorney, Agent, or Firm* — Keating & Bennett, LLP

(57)     ABSTRACT

An actuator device includes a drive assembly that is movable in a first direction, a sensor magnet that extends in the first direction that is a magnetization direction, the sensor magnet being fixed to the drive assembly, and a magnetic sensor that opposes the sensor magnet in a second direction intersecting the first direction to detect a magnetic flux of the sensor magnet. As viewed from the second direction, a width of the sensor magnet at a portion where a barycenter of the sensor magnet is positioned is wider than a width of two ends of the sensor magnet in the first direction.

6 Claims, 4 Drawing Sheets

(56)         References Cited

FOREIGN PATENT DOCUMENTS

WO       WO-2019193716 A1  *  10/2019   ............. G01D 5/245

OTHER PUBLICATIONS

Machine Translation of EP 1515419 A2 (Year: 2005).*
Machine Translation of EP 2747257 A2 (Year: 2003).*
Machine Translation of WO 2019193716 A1 (Year: 2019).*
Machine Translation of CN 110291697 A (Year: 2019).*
Machine Translation of JP 2019146437 A (Year: 2019).*

* cited by examiner

ACTUATOR DEVICE

CROSS-REFERENCE TO RELATED APPLICATIONS

The present application claims priority under 35 U.S.C. § 119 to Japanese Patent Application No. 2023-121484, filed on Jul. 26, 2023, the entire contents of which are hereby incorporated herein by reference.

FIELD OF THE INVENTION

The present disclosure relates to actuator devices.

BACKGROUND

A linear actuator in which a magnet is fixed to a reciprocating support member and a position of the support member is controlled based on a magnetic flux of a magnet detected by an IC sensor is known.

In the linear actuator as described above, the magnetic flux density of the magnet in the magnetization direction decreases in the vicinity of the magnetic pole boundary, which is a boundary between the pair of magnetic poles. Therefore, the magnetic flux density detected when the IC sensor faces the vicinity of the magnetic pole boundary of the magnet may be smaller than the lower limit of the magnetic flux density detectable by the IC sensor. In this case, there is a possibility that the IC sensor cannot accurately detect the position of the magnet and the position of the support member.

SUMMARY

One example embodiment of an actuator device of the present disclosure includes a drive assembly that is movable in a first direction, a sensor magnet that extends in the first direction that is a magnetization direction, the sensor magnet being fixed to the drive assembly, and a magnetic sensor that opposes the sensor magnet in a second direction intersecting the first direction to detect a magnetic flux of the sensor magnet. As viewed from the second direction, a width of the sensor magnet at a portion where a barycenter of the sensor magnet is positioned is wider than a width of two ends of the sensor magnet in the first direction.

The above and other elements, features, steps, characteristics and advantages of the present disclosure will become more apparent from the following detailed description of the example embodiments with reference to the attached drawings.

DETAILED DESCRIPTION

In each drawing, a first direction D1 is a direction in which a drive assembly is movable. In the following description, a side on which an arrow in the first direction D1 is pointed (+D1 side) is called "lower side", and a side opposite to the side on which the arrow in the first direction D1 is pointed (−D1 side) is called "upper side". The upper side and the lower side are simply terms for describing a relative positional relationship of components, and thus an actual placement relationship and the like may be other than the placement relationship and the like indicated by these terms.

In each drawing, a second direction D2 is a direction intersecting the first direction D1. In the present example embodiment, the second direction D2 is orthogonal to the first direction D1. In the following description, a side on which an arrow in the second direction D2 is pointed (+D2 side) is called "one side in the second direction D2", and a side opposite to the side on which the arrow in the second direction D2 is pointed (−D2 side) is called "other side in the second direction D2".

In each drawing, a third direction D3 is a direction orthogonal to both the first direction D1 and the second direction D2. In the present example embodiment, the third direction D3 is a width direction of the sensor magnet. In the following description, a side on which an arrow in the third direction D3 is pointed (+D3 side) is called "one side in the width direction", and a side opposite to the side on which the arrow in the third direction D3 is pointed (−D3 side) is called "other side in the width direction".

A rotation axis J shown in each drawing is an imaginary axis extending in a direction parallel to the first direction D1. The rotation axis J is a central axis of a motor shaft. In the following description, a radial direction about the rotation axis J is simply called "radial". A circumferential direction about the rotation axis J is simply called "circumferential". In each figure, the circumferential direction is indicated by an arrow θ.

Figure 1:
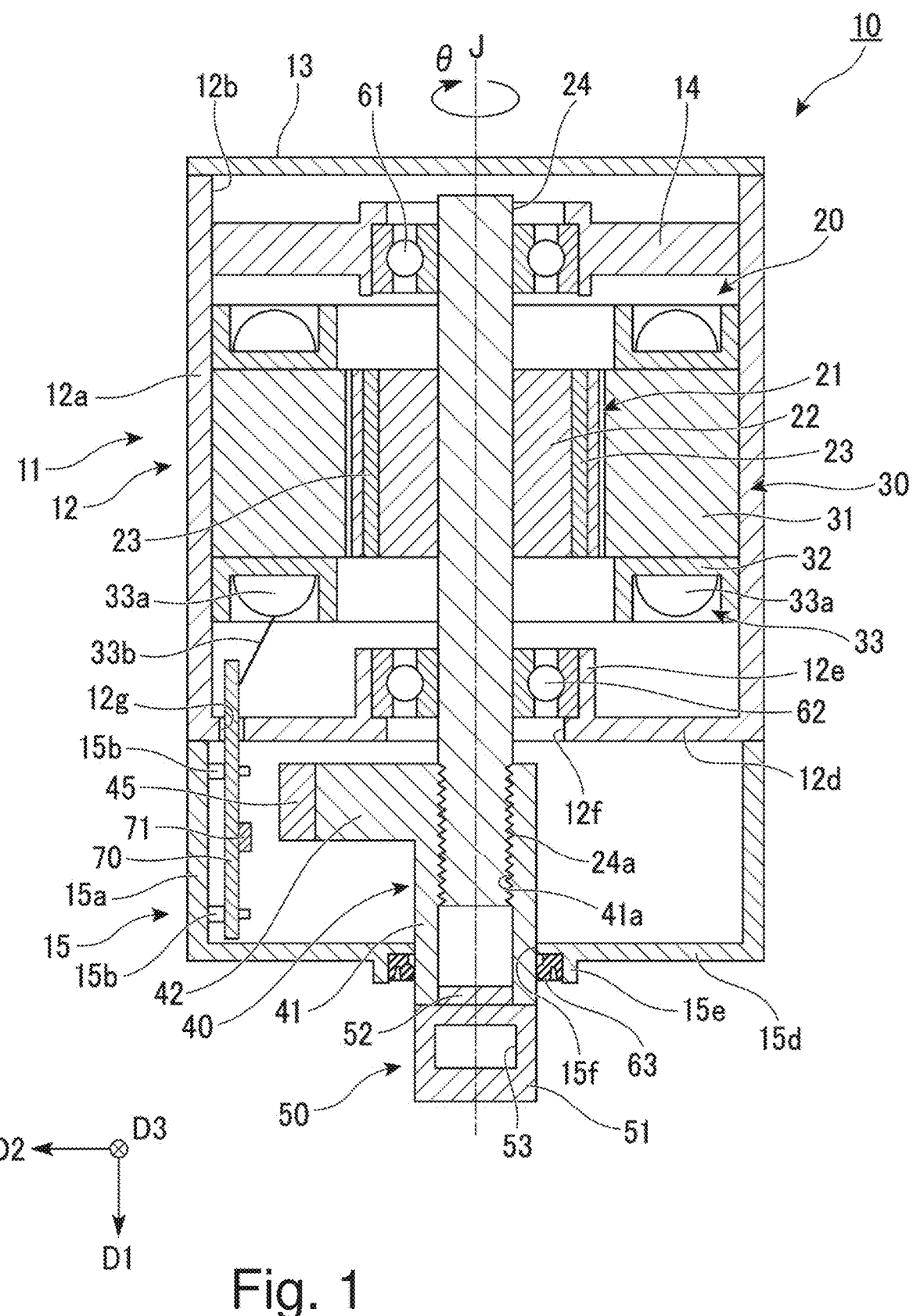
FIG. 1 is a cross-sectional view showing an actuator device of an example embodiment of the present invention.

An actuator device 10 of the present example embodiment shown in FIG. 1 is a linear actuator that moves a drive target (not shown) in the first direction D1. The actuator device 10 extends in the first direction D1 as a whole. The actuator device 10 includes a housing 11, a motor assembly 20, a drive assembly 40, a sensor magnet 45, an output unit 50, a circuit board 70, and a magnetic sensor 71.

The housing 11 internally accommodates the motor assembly 20, the drive assembly 40, the sensor magnet 45, the circuit board 70, and the magnetic sensor 71. The housing 11 includes a housing body part 12, a lid member 13, a first bearing holding portion 14, and a drive assembly accommodation member 15. The lid member 13 is fixed to the upper end of the housing body part 12. The first bearing holding portion 14 is accommodated in the housing body part 12. The drive assembly accommodation member 15 is fixed to the lower end of the housing body part 12.

The housing body part 12 has a substantially cylindrical shape extending in the first direction D1 about the rotation axis J. The housing body part 12 is open upward. The housing body part 12 internally accommodates the motor assembly 20. The housing body part 12 includes a peripheral wall part 12a and a bottom wall part 12d.

The peripheral wall part 12a has a substantially cylindrical shape extending in the first direction D1 about the rotation axis J. The peripheral wall part 12a surrounds the motor assembly 20 from the radially outer side. The upper end of the peripheral wall part 12a is the upper end of the housing body part 12. The peripheral wall part 12a has an opening part 12b that opens upward.

The bottom wall part 12d has a plate shape expanding in a direction orthogonal to the first direction D1. The radially outer edge of the bottom wall part 12*d* is continuous with the lower end of the peripheral wall part 12*a*. The bottom wall part 12*d* separates the inside of the housing body part 12 and the inside of the drive assembly accommodation member 15. The bottom wall part 12*d* is provided with a second bearing holding portion 12*e*, a through hole 12*f*, and an insertion hole 12*g*.

The second bearing holding portion 12*e* protrudes upward from the bottom wall part 12*d*. The second bearing holding portion 12*e* has a substantially cylindrical shape about the rotation axis J. The second bearing holding portion 12*e* is open upward. A second bearing 62 is held on the inner peripheral surface of the second bearing holding portion 12*e*.

Each of the through hole 12*f* and the insertion hole 12*g* is a hole penetrating the bottom wall part 12*d* in the first direction D1. As viewed from the first direction D1, the through hole 12*f* has a substantially circular shape about the rotation axis J. The inner diameter of the through hole 12*f* is smaller than the inner diameter of the second bearing holding portion 12*e*. The insertion hole 12*g* is provided at an edge part on one side (+D2 side) in the second direction D2 of the bottom wall part 12*d*.

The lid member 13 has a disk shape about the rotation axis J. The plate surface of the lid member 13 faces the first direction D1. The lid member 13 is fixed to the upper end of the peripheral wall part 12*a*. The lid member 13 closes the opening part 12*b* from above.

The first bearing holding portion 14 has a substantially annular shape about the rotation axis J. The outer peripheral surface of the first bearing holding portion 14 is fixed to the inner peripheral surface of the peripheral wall part 12*a*. Accordingly, the first bearing holding portion 14 is fixed to the housing body part 12. A first bearing 61 is held on the inner peripheral surface of the first bearing holding portion 14.

The drive assembly accommodation member 15 has a substantially cylindrical shape extending in the first direction D1 about the rotation axis J. The drive assembly accommodation member 15 is open upward. The drive assembly accommodation member 15 internally accommodates the drive assembly 40, the sensor magnet 45, the output unit 50, the circuit board 70, and the magnetic sensor 71. The drive assembly accommodation member 15 has an annular wall part 15*a* and a bottom part 15*d*.

The annular wall part 15*a* has a substantially cylindrical shape extending in the first direction D1 about the rotation axis J. The annular wall part 15*a* surrounds the drive assembly 40, the sensor magnet 45, the output unit 50, the circuit board 70, and the magnetic sensor 71 from radially outside. The annular wall part 15*a* is open upward. The annular wall part 15*a* is provided with a plurality of board holding portions 15*b*. Each of the board holding portions 15*b* has a columnar shape protruding from a part on one side (+D2 side) in the second direction D2 of the annular wall part 15*a* toward the other side (−D2 side) in the second direction D2. Each of the board holding portions 15*b* holds the circuit board 70.

The bottom part 15*d* has a plate shape expanding in a direction orthogonal to the first direction D1. The radially outer edge of the bottom part 15*d* is continuous with the lower end of the annular wall part 15*a*. The bottom part 15*d* is provided with a sealing member holding portion 15*e* and a bottom through hole 15*f*.

The sealing member holding portion 15*e* protrudes downward from the bottom part 15*d*. The sealing member holding portion 15*e* has a substantially annular shape about the rotation axis J. The sealing member holding portion 15*e* is open downward. A sealing member 63 is held on the inner surface of the sealing member holding portion 15*e*.

The bottom through hole 15*f* is a hole penetrating the bottom part 15*d* in the first direction D1. As viewed from the first direction D1, the bottom through hole 15*f* has a substantially circular shape about the rotation axis J. The inner diameter of the bottom through hole 15*f* is smaller than the inner diameter of the sealing member holding portion 15*e*.

The motor assembly 20 is accommodated in the housing body part 12. The motor assembly 20 includes a rotor 21 and a stator 30. In the present example embodiment, the motor assembly 20 rotationally drives the rotor 21 about the rotation axis J by the current supplied from the circuit board 70, and transmits the power of the rotor 21 to the drive assembly 40.

The rotor 21 is rotatable about the rotation axis J. The rotor 21 includes a rotor core 22, a plurality of rotor magnets 23, and a shaft 24. That is, the motor assembly 20 includes the shaft 24. The rotor core 22 has an annular shape about the rotation axis J. Each of the plurality of rotor magnets 23 is fixed to the rotor core 22. The rotor magnets 23 are arranged at intervals along the circumferential direction.

The shaft 24 has a substantially cylindrical shape extending in the first direction D1 about the rotation axis J. The shaft 24 extends in the first direction D1 over the inside of the housing body part 12 and the inside of the drive assembly accommodation member 15. The shaft 24 is passed through the inside of the rotor core 22 in the first direction D1. The rotor core 22 is fixed on the outer peripheral surface of the shaft 24. A part of the shaft 24 upper than the rotor core 22 is rotatably supported about the rotation axis J by the first bearing 61. A part of the shaft 24 lower than the rotor core 22 is rotatably supported about the rotation axis J by the second bearing 62. Due to them, the shaft 24 is rotatable about the rotation axis J. The lower end of the shaft 24 is passed through the through hole 12*f* in the first direction D1 and protrudes into the drive assembly accommodation member 15. The shaft 24 is provided with a second screw portion 24*a*. The second screw portion 24*a* is a male screw provided in a part of the outer peripheral surface of the shaft 24, the part positioned inside the drive assembly accommodation member 15.

The first bearing 61 and the second bearing 62 have annular shapes about the rotation axis J. As described above, the first bearing 61 is held on the inner peripheral surface of the first bearing holding portion 14. The second bearing 62 is held on the inner peripheral surface of the second bearing holding portion 12*e*. As described above, the first bearing 61 and the second bearing 62 support the shaft 24 rotatably about the rotation axis J. In the present example embodiment, the first bearing 61 and the second bearing 62 are ball bearings. The first bearing 61 and the second bearing 62 may be plain bearings.

The stator 30 is disposed radially outside the rotor 21. The stator 30 is disposed to face the rotor 21 across a gap in the radial direction. The stator 30 includes a stator core 31, an insulator 32, and a coil portion 33.

The stator core 31 has an annular shape surrounding the rotor core 22 from the radial outside. The stator core 31 faces the rotor 21 across a gap in the radial direction. The stator core 31 is fixed to the inner peripheral surface of the peripheral wall part 12*a*. Accordingly, the stator 30 is fixed to the housing 11. The insulator 32 is mounted to the stator core 31. The insulator 32 insulates the stator core 31 from the coil portion 33.

The coil portion 33 includes a plurality of coil body parts 33a and a coil lead wire 33b. Each of the coil body parts 33a is mounted to the stator core 31 via the insulator 32. The coil body parts 33a are arranged at intervals along the circumferential direction. The coil lead wire 33b is led downward from the coil body part 33a and connected to the circuit board 70. Accordingly, the coil portion 33 is electrically connected to the circuit board 70. When the coil portion 33 is supplied with a current from the circuit board 70, the rotor 21 rotates about the rotation axis J. By controlling the current supplied to the coil portion 33, the circuit board 70 can control the rotation speed, the rotation direction, and the like of the rotor 21. By controlling the rotation speed, the rotation direction, and the like of the rotor 21, the circuit board 70 can control the moving speed and the moving direction in the first direction D1 of the drive assembly 40.

The drive assembly 40 is accommodated inside the drive assembly accommodation member 15. The drive assembly 40 is connected to a part of the shaft 24, the part positioned inside the drive assembly accommodation member 15. The drive assembly 40 converts the rotational motion of the motor assembly 20 into a linear motion and transmits the linear motion to the output unit 50. The drive assembly 40 has a tubular shape extending in the first direction D1. The drive assembly 40 surrounds the rotation axis J. The drive assembly 40 includes a tubular part 41 and a protrusion part 42.

The tubular part 41 has a substantially cylindrical shape extending in the first direction D1 about the rotation axis J. The tubular part 41 is open on both sides in the first direction D1. A part of the shaft 24, the part positioned inside the drive assembly accommodation member 15, is inserted into the tubular part 41. The lower end of the tubular part 41 protrudes to the outside of the actuator device 10 through the bottom through hole 15f. The tubular part 41 is provided with a first screw portion 41a that meshes with the second screw portion 24a. The first screw portion 41a is a female screw provided on the inner peripheral surface of the tubular part 41.

The protrusion part 42 protrudes from the tubular part 41 to one side (+D2 side) in the second direction D2. The protrusion part 42 faces the circuit board 70 at an interval in the second direction D2. The sensor magnet 45 is fixed to an end part of the protrusion part 42 on one side in the second direction D2.

The output unit 50 is fixed to the lower end of the tubular part 41. The output unit 50 is positioned outside the housing 11. The output unit 50 includes an output body part 51 and an output protrusion part 52. The output body part 51 has a plate shape protruding in the first direction D1. In the present example embodiment, the output body part 51 has a substantially quadrangular plate shape expanding in a direction orthogonal to the third direction D3. The output body part 51 is provided with an attachment hole 53. The attachment hole 53 is a hole penetrating the output body part 51 in the third direction D3. The output protrusion part 52 protrudes upward from the upper end of the output body part 51. The output protrusion part 52 has a substantially disk shape about the rotation axis J. The output protrusion part 52 is positioned inside the tubular part 41. The output protrusion part 52 is fixed to the inner peripheral surface of the tubular part 41. Accordingly, the output unit 50 is fixed to the drive assembly 40.

The attachment hole 53 is attached with the drive target (not shown) moved in the first direction D1 by the actuator device 10. Since the attachment hole 53 is attached with the drive target, the output unit 50 is suppressed from rotating about the rotation axis J. Accordingly, the drive assembly 40 fixed to the output unit 50 is also suppressed from rotating about the rotation axis J.

When the stator 30 is supplied with a current from the circuit board 70 and the shaft 24 rotates about the rotation axis J, the second screw portion 24a of the shaft 24 relatively rotates about the rotation axis J with respect to the first screw portion 41a of the drive assembly 40. As described above, rotation of the drive assembly 40 about the rotation axis J is suppressed. Therefore, when the shaft 24 rotates about the rotation axis J, the first screw portion 41a is sent in the first direction D1 with respect to the second screw portion 24a. Accordingly, the drive assembly 40 is movable in the first direction D1. When the drive assembly 40 moves in the first direction D1, the output unit 50 fixed to the drive assembly 40 moves in the first direction D1. Accordingly, the actuator device 10 can move the drive target (not shown) in the first direction D1.

According to the present example embodiment, the drive assembly 40 has a tubular shape having the first screw portion 41a provided on the inner peripheral surface and extending in the first direction D1, and the outer peripheral surface of the shaft 24 is provided with the second screw portion 24a meshing with the first screw portion 41a. Therefore, the rotational motion about the rotation axis J of the shaft 24 can be converted into the linear motion in the first direction D1 of the drive assembly 40 only by the first screw portion 41a provided in the drive assembly 40 and the second screw portion 24a provided in the shaft 24. Therefore, since a separate member for converting the rotational motion of the shaft 24 into the linear motion of the drive assembly 40 is unnecessary, it is possible to suppress an increase in the number of components and manufacturing cost of the actuator device 10.

The sealing member 63 is held on the inner peripheral surface of the sealing member holding portion 15e. The sealing member 63 according to the present example embodiment is a lip seal having a lip part radially inside. The lip part of the sealing member 63 is in contact with the outer peripheral surface of the tubular part 41 of the drive assembly 40. Accordingly, the sealing member 63 seals between the drive assembly 40 and the housing 11.

The circuit board 70 has a plate shape expanding in a direction orthogonal to the second direction D2. The plate surface of the circuit board 70 faces the second direction D2. The circuit board 70 is disposed on one side (+D2 side) in the second direction D2 of the sensor magnet 45. The circuit board 70 faces the sensor magnet 45 at an interval in the second direction D2. Although not shown, the circuit board 70 is provided with a plurality of board holes penetrating the circuit board 70 in the second direction D2. The board holding portions 15b different from one another are inserted into the respective board holes. The board holding portion 15b is fixed to the inner peripheral surface of each of the board holes. Accordingly, the circuit board 70 is fixed to the housing 11. The magnetic sensor 71 is mounted on a surface of the circuit board 70, the surface facing the other side (−D2 side) in the second direction D2.

The magnetic sensor 71 is a sensor that can detect a magnetic flux of the sensor magnet 45 fixed to the protrusion part 42 of the drive assembly 40. The magnetic sensor 71 is disposed at an interval in the second direction D2 from the sensor magnet 45. In the second direction D2, the magnetic sensor 71 is disposed to face the sensor magnet 45. In the present example embodiment, the magnetic sensor 71 is a magnetic sensor including a Hall element such as a Hall IC. The magnetic sensor 71 may be a magnetic sensor including a magnetic resistance (MR) sensor element. The circuit board 70 can detect the position in the first direction D1 of the sensor magnet 45 by the magnetic flux of the sensor magnet 45 detected by the magnetic sensor 71. Accordingly, the circuit board 70 can detect the positions in the first direction D1 of the drive assembly 40 and the output unit 50. The circuit board 70 controls the motor assembly 20 based on the magnetic flux of the sensor magnet 45 detected by the magnetic sensor 71. More specifically, the circuit board 70 controls the current supplied to the stator 30 based on the magnetic flux of the sensor magnet 45 detected by the magnetic sensor 71. Accordingly, the circuit board 70 determines the position in the first direction D1 of the drive assembly 40 by controlling the rotation speed, the rotation direction, and the like of the rotor 21.

According to the present example embodiment, the actuator device 10 includes the circuit board 70 mounted with the magnetic sensor 71, and the circuit board 70 controls the motor assembly 20 based on the magnetic flux of the sensor magnet 45 detected by the magnetic sensor 71. Therefore, since the magnetic sensor 71 is mounted on the circuit board 70, it is not necessary to separately provide a signal line for electrically connecting the magnetic sensor 71 and the circuit board 70. Therefore, it is possible to suppress an increase in the number of components of the actuator device 10. Since man-hours for connecting a signal line to each of the magnetic sensor 71 and the circuit board 70 is unnecessary, it is possible to suppress an increase in the number of manufacturing man-hours of the actuator device 10.

As described above, the sensor magnet 45 is fixed to the end part in the second direction D2 on one side (+D2 side) of the protrusion part 42. More specifically, the sensor magnet 45 is fixed to a surface facing one side in the second direction D2 of the outer surface of the protrusion part 42. The sensor magnet 45 is movable in the first direction D1 together with the drive assembly 40. The sensor magnet 45 faces the magnetic sensor 71 at an interval in the second direction D2.

Figure 2:
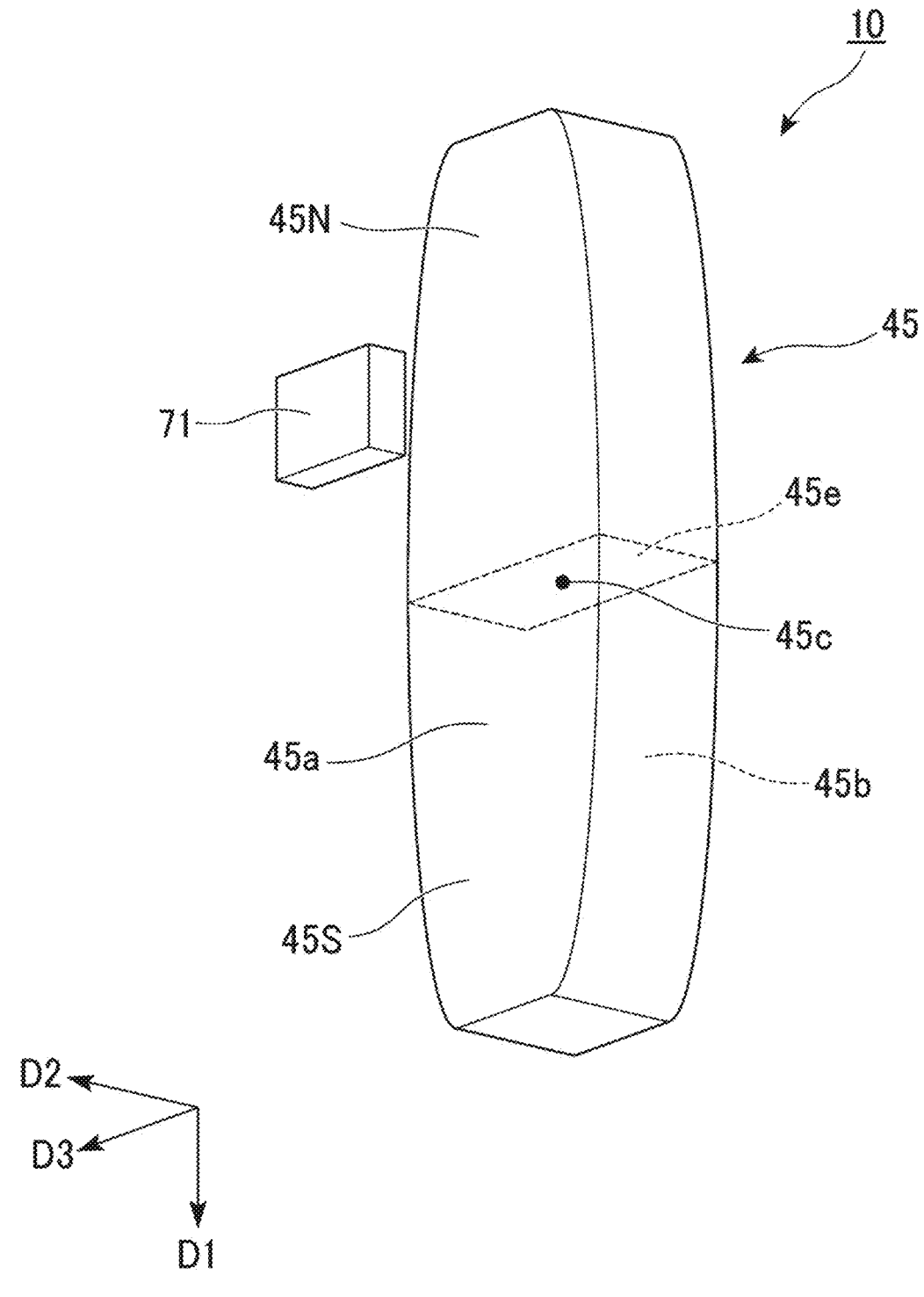
FIG. 2 is a perspective view showing a portion of the actuator device of an example embodiment of the present invention.

As shown in FIG. 2, the sensor magnet 45 extends in the first direction D1. In the sensor magnet 45, the first direction D1 is the magnetization direction. In the present example embodiment, an S pole portion 45S of the sensor magnet 45 is a lower part of the sensor magnet 45. An N pole portion 45N of the sensor magnet 45 is an upper part of the sensor magnet 45. The S pole portion 45S may be an upper part of the sensor magnet 45, and the N pole portion 45N may be a lower part of the sensor magnet 45. As viewed from the second direction D2, the width of the sensor magnet 45 increases from each of the end parts on both sides in the first direction D1 toward the center in the first direction D1. In the present example embodiment, the sensor magnet 45 has a plane-symmetrical shape in which a plane passing through the center in the first direction D1 of the sensor magnet 45 and expanding in a direction orthogonal to the first direction D1 is a symmetry plane. The sensor magnet 45 needs not have a plane-symmetrical shape with respect to a plane passing through the center in the first direction D1 of the sensor magnet 45 and expanding in a direction orthogonal to the first direction D1. A barycenter 45c of the sensor magnet 45 is positioned at the center in the first direction D1 of the sensor magnet 45. In the first direction D1, the barycenter 45c of the sensor magnet 45 may be positioned at a position other than the center in the first direction D1 of the sensor magnet 45. As viewed from the second direction D2, the width of the sensor magnet 45 at the part where the barycenter 45c of the sensor magnet 45 is positioned is wider than the width of both ends in the first direction D1 of the sensor magnet 45. A magnetic pole boundary 45e, which is a boundary between the S pole portion 45S and the N pole portion 45N, passes through the barycenter 45c.

In the present example embodiment, as viewed from the second direction D2, each end part on both sides in the width direction (third direction D3) of the sensor magnet 45 has a curved shape. More specifically, each of the end parts on both sides in the width direction of the sensor magnet 45 has a curved shape in which the center in the first direction D1 protrudes outward in the width direction. Each of a surface 45a facing one side (+D2 side) in the second direction D2 of the sensor magnet 45 and a surface 45b facing the other side (−D2 side) in the second direction D2 has a planar shape. That is, the surfaces 45a and 45b facing the second direction D2 of the sensor magnet 45 have planar shapes parallel to each other. Therefore, according to the present example embodiment, it is possible to suppress an increase in size in the second direction D2 of the sensor magnet 45 as compared with a case where the surfaces 45a and 45b facing the second direction D2 of the sensor magnet 45 have curved surfaces shape protruding in the second direction D2. Therefore, it is possible to suppress an increase in size in the second direction D2 of the actuator device 10.

Figure 3:
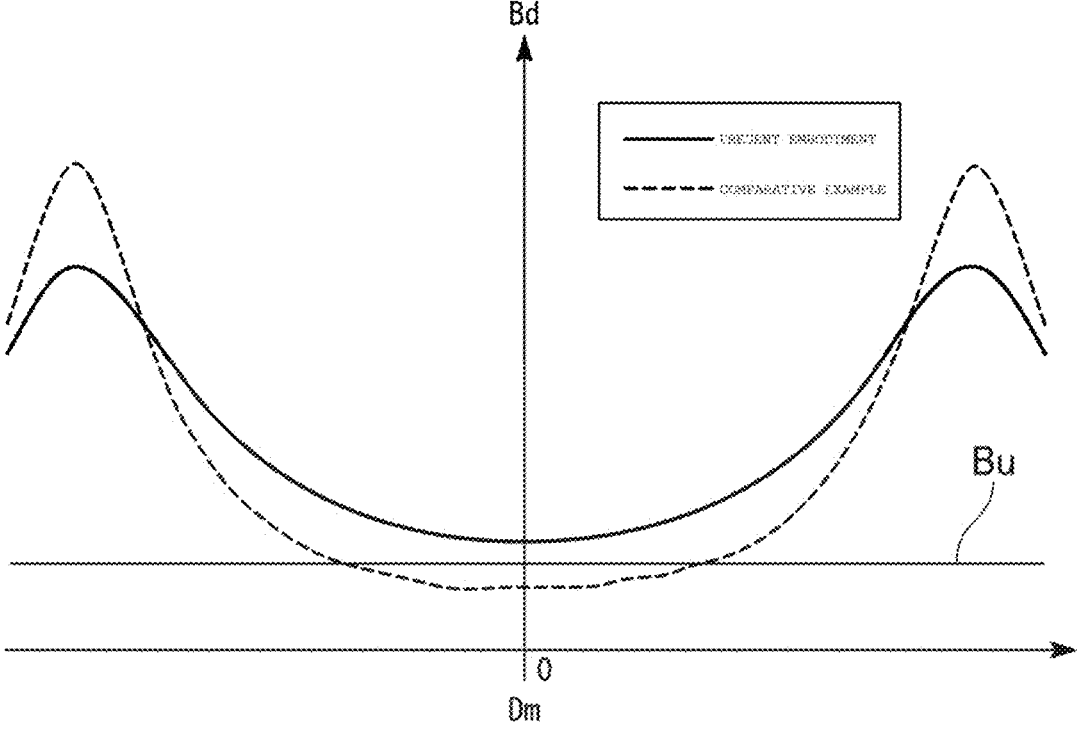
FIG. 3 is a view showing an example of a magnetic flux density of a magnet detected by a magnetic sensor of an example embodiment of the present invention.

FIG. 3 is a view showing a relationship between the position of the sensor magnet 45 in the first direction D1 and the magnetic flux density of the sensor magnet 45 detected by the magnetic sensor 71. The horizontal axis in FIG. 3 is a magnet distance Dm, which is a distance between the magnetic sensor 71 and the magnetic pole boundary 45e of the sensor magnet 45 in the first direction D1. When the magnet distance Dm is 0, the magnetic sensor 71 faces the magnetic pole boundary 45e of the sensor magnet 45 in the second direction D2. When the magnet distance Dm is positive, the magnetic pole boundary 45e is positioned lower than the magnetic sensor 71. When the magnet distance Dm is negative, the magnetic pole boundary 45e is positioned upper than the magnetic sensor 71. The vertical axis in FIG. 3 is a detection magnetic flux density Bd, which is a magnetic flux density of the sensor magnet 45 detected by the magnetic sensor 71. A detectable magnetic flux density Bu shown in FIG. 3 is a lower limit of the magnetic flux density detectable by the magnetic sensor 71. When the detection magnetic flux density Bd becomes smaller than the detectable magnetic flux density Bu, the detection accuracy of the magnetic flux density of the magnetic sensor 71 decreases. Accordingly, the detection accuracy of the position of the drive assembly 40 in the first direction D1 detected by the circuit board 70 decreases, and therefore the accuracy with which the circuit board 70 determines the position of the drive assembly 40 in the first direction D1 decreases.

First, the detection magnetic flux density Bd of a sensor magnet of a comparative example of the present example embodiment will be described. In FIG. 3, the detection magnetic flux density Bd of the sensor magnet of the comparative example is indicated by a broken line. Although not shown, the sensor magnet of the comparative example has a cuboid shape extending in the first direction D1. As viewed from the second direction D2, the sensor magnet of the comparative example has a rectangular shape. The volume of the sensor magnet of the comparative example is the same as the volume of the sensor magnet 45 of the present example embodiment. Other configurations and the like of the sensor magnet of the comparative example are similar to the configurations and the like of the sensor magnet 45 of the present example embodiment. As shown in FIG. 3, the sensor magnet of the comparative example has the detection magnetic flux density Bd decreasing from each of both ends in the first direction D1 toward the center in the first direction D1. The detection magnetic flux density Bd when the magnet distance Dm is 0 and a vicinity of 0, that is, the magnetic sensor 71 faces in the second direction D2 the magnetic pole boundary of the sensor magnet and the vicinity of the magnetic pole boundary is smaller than the detectable magnetic flux density Bu. Therefore, in the case of the sensor magnet having a cuboid shape of the comparative example, in order to make the detection magnetic flux density Bd at the magnetic pole boundary of the sensor magnet and in the vicinity of the magnetic pole boundary larger than the detectable magnetic flux density Bu, it is necessary to increase the size of the sensor magnet itself. Therefore, the manufacturing cost of the sensor magnet increases, and the actuator device 10 increases in size. In the following description, parts of the magnetic pole boundary and the vicinity of the magnetic pole boundary of the sensor magnet may be simply called "vicinity of the magnetic pole boundary".

Next, the detection magnetic flux density Bd of the sensor magnet 45 of the present example embodiment will be described. In FIG. 3, the detection magnetic flux density Bd of the sensor magnet 45 is indicated by a solid line. Similarly to the sensor magnet of the comparative example, also the sensor magnet 45 has the detection magnetic flux density Bd decreasing from each of both ends in the first direction D1 toward the center in the first direction D1. However, in the sensor magnet 45 of the present example embodiment, the detection magnetic flux density Bd detected when the magnetic sensor 71 faces in the second direction D2 the vicinity of the magnetic pole boundary 45e is larger than the detectable magnetic flux density Bu.

According to the present example embodiment, the actuator device 10 includes the sensor magnet 45 that extends in the first direction D1 with the first direction D1 as a magnetization direction, the sensor magnet 45 being fixed to the drive assembly 40, and the magnetic sensor 71 that is disposed to face the sensor magnet 45 in the second direction D2 and detects the magnetic flux of the sensor magnet 45, and as viewed from the second direction D2, the width of the sensor magnet 45 at a part where the barycenter 45c of the sensor magnet 45 is positioned is wider than the width of both ends in the first direction D1 of the sensor magnet 45. Therefore, as compared with the sensor magnet of the comparative example having a rectangular shape as viewed from the second direction D2, the sensor magnet 45 of the present example embodiment easily increases the volume in the vicinity of the magnetic pole boundary 45e. Therefore, the sensor magnet 45 of the present example embodiment can increase the magnetic flux density in the vicinity of the magnetic pole boundary 45e. Therefore, as shown in FIG. 3, in the present example embodiment, it is possible to increase the detection magnetic flux density Bd in the vicinity of the magnetic pole boundary 45e while suppressing an increase in size of the sensor magnet 45. Therefore, the detection magnetic flux density Bd in the vicinity of the magnetic pole boundary 45e can be made larger than the detectable magnetic flux density Bu. Accordingly, since the magnetic sensor 71 can accurately detect the magnetic flux density in the vicinity of the magnetic pole boundary 45e, the accuracy with which the circuit board 70 detects the position of the drive assembly 40 in the first direction D1 can be enhanced. Therefore, the position of the drive assembly 40 in the first direction D1 can be accurately determined by the circuit board 70. Since it is possible to suppress an increase in size of the sensor magnet 45, it is possible to suppress an increase in manufacturing cost of the sensor magnet 45 and possible to suppress an increase in size of the actuator device 10.

According to the present example embodiment, as viewed from the second direction D2, each end part on both sides in the width direction (third direction D3) of the sensor magnet 45 has a curved shape. Therefore, as shown in FIG. 3, it is easy to make the detection magnetic flux density Bd with respect to the magnet distance Dm into a smooth curved shape. Accordingly, as compared with a case where the detection magnetic flux density Bd with respect to the magnet distance Dm changes steeply, the circuit board 70 can accurately detect the position in the first direction D1 of the drive assembly 40 based on a detection result of the magnetic sensor 71. Therefore, the position of the drive assembly 40 in the first direction D1 can be determined more accurately by the circuit board 70.

Figure 4:
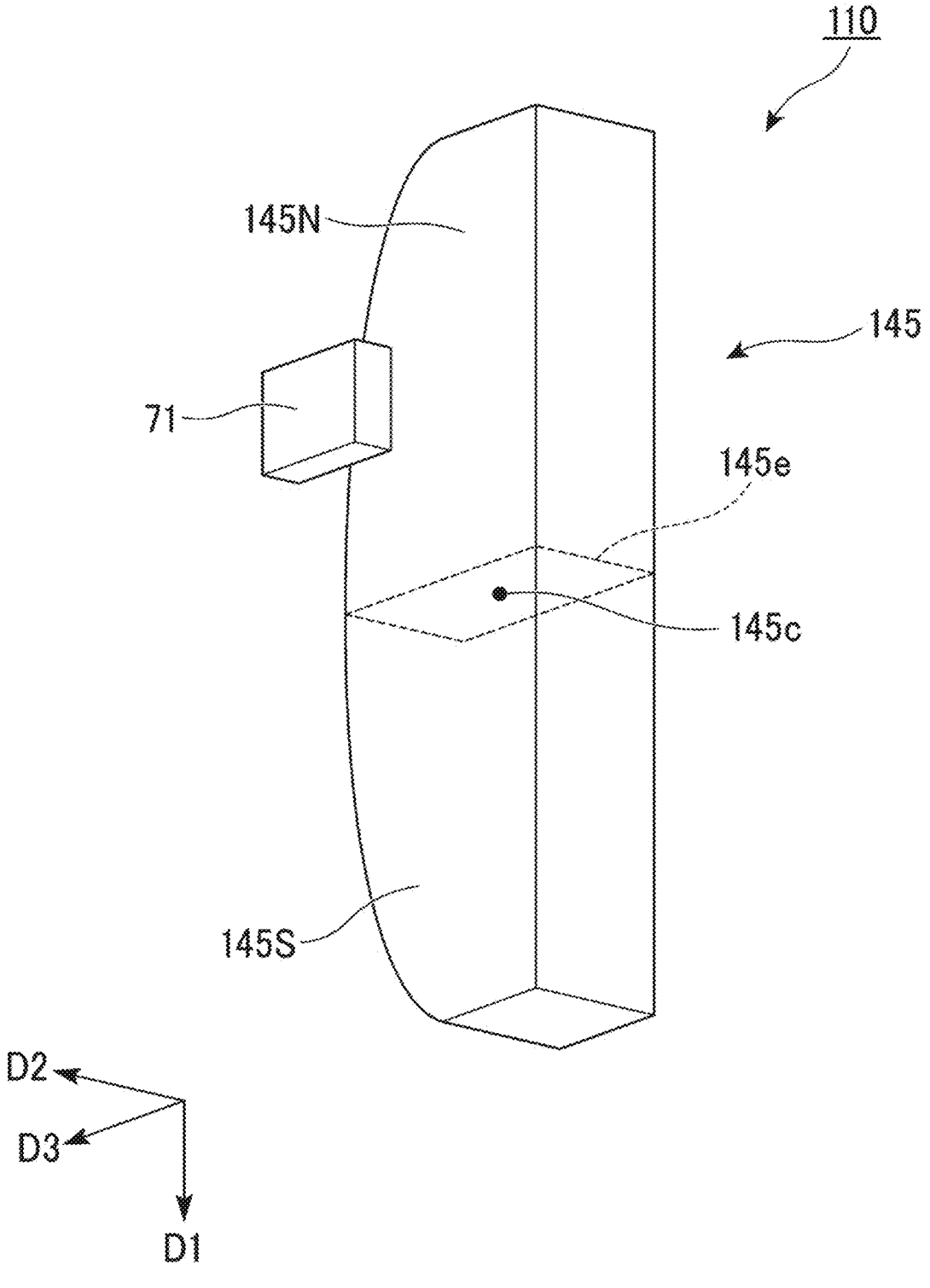
FIG. 4 is a perspective view showing a portion of an actuator device of a modification of an example embodiment of the present invention.

FIG. 4 is a perspective view showing a part of an actuator device 110 of the present modification. In the following description, constituent elements having identical aspects to those in the above-described example embodiment are denoted by identical reference signs, and the description thereof may be omitted.

As shown in FIG. 4, as viewed from the second direction D2, an end part on one side (+D3 side) in the width direction of a sensor magnet 145 of the present modification has a curved shape, and an end part on the other side (−D3 side) in the width direction of the sensor magnet 145 has a linear shape. In the sensor magnet 145, the first direction D1 is the magnetization direction. In the present modification, an S pole portion 145S of the sensor magnet 145 is a lower part of the sensor magnet 145. An N pole portion 145N of the sensor magnet 145 is an upper part of the sensor magnet 145. As viewed from the second direction D2, the width of the sensor magnet 145 increases from each of the end parts on both sides in the first direction D1 toward the center in the first direction D1. In the present example embodiment, a barycenter 145c of the sensor magnet 145 is positioned at the center in the first direction D1 of the sensor magnet 145. In the first direction D1, the barycenter 145c of the sensor magnet 145 may be positioned at a position other than the center in the first direction D1 of the sensor magnet 145. A magnetic pole boundary 145e, which is a boundary between the S pole portion 145S and the N pole portion 145N, passes through the barycenter 145c.

Although not shown, the detection magnetic flux density Bd of the sensor magnet 145 of the present modification is similar to the detection magnetic flux density Bd of the sensor magnet 45 of the above-described example embodiment. That is, the detection magnetic flux density Bd when the magnet distance Dm is a vicinity of 0, that is, the magnetic sensor 71 faces in the second direction D2 the vicinity of the magnetic pole boundary 145e, is larger than the detectable magnetic flux density Bu. Therefore, according to the present modification, since the magnetic sensor 71 can accurately detect the magnetic flux density in the vicinity of the magnetic pole boundary 145e, the accuracy with which the circuit board 70 detects the position of the drive assembly 40 in the first direction D1 can be enhanced. Therefore, the position of the drive assembly 40 in the first direction D1 can be accurately determined by the circuit board 70. Similarly to the above-described example embodiment, since it is possible to suppress an increase in size of the sensor magnet 145, it is possible to suppress an increase in manufacturing cost of the sensor magnet 145 and possible to suppress an increase in size of the actuator device 110.

According to the present modification, as viewed from the second direction D2, the end part on one side (+D3 side) in the width direction of a sensor magnet 145 of the present modification has a curved shape, and the end part on the other side (−D3 side) in the width direction of the sensor magnet 145 has a linear shape. Therefore, similarly to the above-described example embodiment, it is easy to make the detection magnetic flux density Bd with respect to the magnet distance Dm into a smooth curved shape. Accordingly, as compared with a case where the detection magnetic flux density Bd with respect to the magnet distance Dm changes steeply, the circuit board 70 can accurately detect the position in the first direction D1 of the drive assembly 40 based on a detection result of the magnetic sensor 71. Therefore, the position of the drive assembly 40 in the first direction D1 can be determined more accurately by the circuit board 70.

The present disclosure is not limited to the above-described example embodiment, and other configurations and other methods can be employed within the scope of the technical idea of the present disclosure. For example, as viewed from the second direction, the width of the sensor magnet may have a shape that linearly increases from both ends in the first direction toward the center in the first direction.

The magnetic sensor may be mounted on a board different from the circuit board. In this case, the circuit board and the board are electrically connected via a signal line or the like.

The application of the actuator device applied with the present disclosure is not particularly limited. The actuator device may be mounted on any equipment. The actuator device may be mounted on a vehicle, for example. The configurations described in the present description can be appropriately combined within a range not contradictory to one another.

Note that the present technique can have a configuration as described below. (1) An actuator device including: a drive assembly that is movable in a first direction; a sensor magnet that extends in the first direction with the first direction as a magnetization direction, the sensor magnet being fixed to the drive assembly; and a magnetic sensor that is disposed to face the sensor magnet in a second direction intersecting the first direction and detects a magnetic flux of the sensor magnet, in which as viewed from the second direction, a width of the sensor magnet at a part where a barycenter of the sensor magnet is positioned is wider than a width of both ends in the first direction of the sensor magnet. (2) The actuator device according to (1), in which a surface of the sensor magnet, the surface facing the second direction, has a planar shape. (3) The actuator device according to (1) or (2), in which each of end parts on both sides in a width direction of the sensor magnet has a curved shape as viewed from the second direction. (4) The actuator device according to (1) or (2), in which as viewed from the second direction, an end part on one side in a width direction of the sensor magnet has a curved shape, and an end part on the other side in a width direction of the sensor magnet has a linear shape. (5) The actuator device according to any one of (1) to (4) including: a motor assembly including a shaft extending in the first direction and rotatable about a rotation axis extending in a direction parallel to the first direction, in which the drive assembly has a tubular shape having an inner peripheral surface provided with a first screw portion, the tubular shape extending in the first direction, and an outer peripheral surface of the shaft is provided with a second screw portion that meshes with the first screw portion. (6) The actuator device according to (5) including: a circuit board mounted with the magnetic sensor, in which the circuit board controls the motor assembly based on a magnetic flux of the sensor magnet detected by the magnetic sensor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An actuator device comprising:
   a drive assembly that is movable in a first direction;
   a sensor magnet that extends in the first direction that is a magnetization direction, the sensor magnet being fixed to the drive assembly; and
   a magnetic sensor that opposes the sensor magnet in a second direction intersecting the first direction to detect a magnetic flux of the sensor magnet; wherein
   as viewed from the second direction, a width of the sensor magnet at a portion where a barycenter of the sensor magnet is positioned is wider than a width of two ends of the sensor magnet in the first direction.

2. The actuator device according to claim 1, wherein a surface of the sensor magnet that opposes the second direction has a planar shape.

3. The actuator device according to claim 1, wherein each of end portions on two sides of the sensor magnet in a width direction has a curved shape as viewed from the second direction.

4. The actuator device according to claim 1, wherein as viewed from the second direction, an end portion on one side of the sensor magnet in a width direction has a curved shape, and an end portion on another side of the sensor magnet in a width direction has a linear shape.

5. The actuator device according to claim 1, further comprising:
   a motor assembly including a shaft extending in the first direction and rotatable about a rotation axis extending in a direction parallel or substantially parallel to the first direction; wherein
   the drive assembly has a tubular shape including an inner peripheral surface provided with a first screw portion, the tubular shape extending in the first direction; and
   an outer peripheral surface of the shaft is provided with a second screw portion that meshes with the first screw portion.

6. The actuator device according to claim 5, further comprising:
   a circuit board mounted with the magnetic sensor and operable to control the motor assembly based on a magnetic flux of the sensor magnet detected by the magnetic sensor.

\* \* \* \* \*